(12) United States Patent
Ma et al.

(10) Patent No.: US 11,312,217 B2
(45) Date of Patent: Apr. 26, 2022

(54) SLIDING-TYPE SEALING ASSEMBLY FOR DOOR OF VEHICLE

(71) Applicants: Hyundai Motor Company, Seoul (KR); Kia Motors Corporation, Seoul (KR)

(72) Inventors: Dong-Hee Ma, Gyeonggi-do (KR); Jae-Seung Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 84 days.

(21) Appl. No.: 16/701,282

(22) Filed: Dec. 3, 2019

(65) Prior Publication Data
US 2020/0338971 A1    Oct. 29, 2020

(30) Foreign Application Priority Data

Apr. 25, 2019    (KR) .................. 10-2019-0048591

(51) Int. Cl.
| | |
|---|---|
| *B60J 10/40* | (2016.01) |
| *B60J 10/86* | (2016.01) |
| *E06B 7/215* | (2006.01) |
| *E06B 7/21* | (2006.01) |
| *B60J 10/24* | (2016.01) |
| *B60J 5/04* | (2006.01) |

(52) U.S. Cl.
CPC .............. *B60J 10/40* (2016.02); *B60J 10/86* (2016.02); *E06B 7/21* (2013.01); *E06B 7/215* (2013.01); *B60J 5/0479* (2013.01); *B60J 10/24* (2016.02)

(58) Field of Classification Search
CPC .......... B60J 10/40; B60J 10/86; B60J 5/0479; E06B 7/18; E06B 7/21; E06B 7/215
See application file for complete search history.

(56) References Cited

U.S. PATENT DOCUMENTS

| | | | | |
|---|---|---|---|---|
| 8,123,278 | B1* | 2/2012 | McKenney | B60J 5/0479 |
| | | | | 296/146.9 |
| 10,322,625 | B2* | 6/2019 | Sakakibara | B60J 5/0479 |
| 10,337,227 | B2* | 7/2019 | Stoof | B60J 10/40 |
| 2012/0019023 | A1* | 1/2012 | Konchan | B60J 10/86 |
| | | | | 296/146.9 |
| 2012/0023830 | A1* | 2/2012 | Bazzi | B60J 10/84 |
| | | | | 49/484.1 |

(Continued)

FOREIGN PATENT DOCUMENTS

KR    20-0344140 Y1    3/2004

*Primary Examiner* — Gregory J Strimbu
(74) *Attorney, Agent, or Firm* — Mintz Levin Cohn Ferris Glovsky and Popeo, P.C.; Peter F. Corless

(57) ABSTRACT

A sealing assembly for a door of a vehicle includes a housing provided on the door, a sealing slider retractably mounted in the housing, a drawing-out device for urging the sealing slider away from the housing, an inserting device for urging the sealing slider into the housing, and a weather strip for air-tight sealing with the sealing slider when the door is closed, where the drawing-out device includes an operating lever rotatably installed on the housing to push an end portion of the sealing slider away from the housing and a support to rotate the operating lever in response to closing of the door, where the sealing slider is slidably movable between a first door and a second door.

14 Claims, 16 Drawing Sheets

(56) References Cited

U.S. PATENT DOCUMENTS

| | | | |
|---|---|---|---|
| 2012/0091749 A1* | 4/2012 | Charnesky | B60J 5/0479 |
| | | | 296/146.1 |
| 2012/0133175 A1* | 5/2012 | Charnesky | B60J 10/40 |
| | | | 296/146.4 |
| 2012/0153678 A1* | 6/2012 | Konchan | B60J 10/24 |
| | | | 296/202 |
| 2012/0193938 A1* | 8/2012 | Krajenke | B60R 13/0243 |
| | | | 296/146.7 |
| 2012/0280531 A1* | 11/2012 | Charnesky | E05C 19/002 |
| | | | 296/146.1 |
| 2017/0267073 A1* | 9/2017 | Lovelace | B60J 5/0479 |
| 2020/0308882 A1* | 10/2020 | Salter | B60J 10/86 |

* cited by examiner

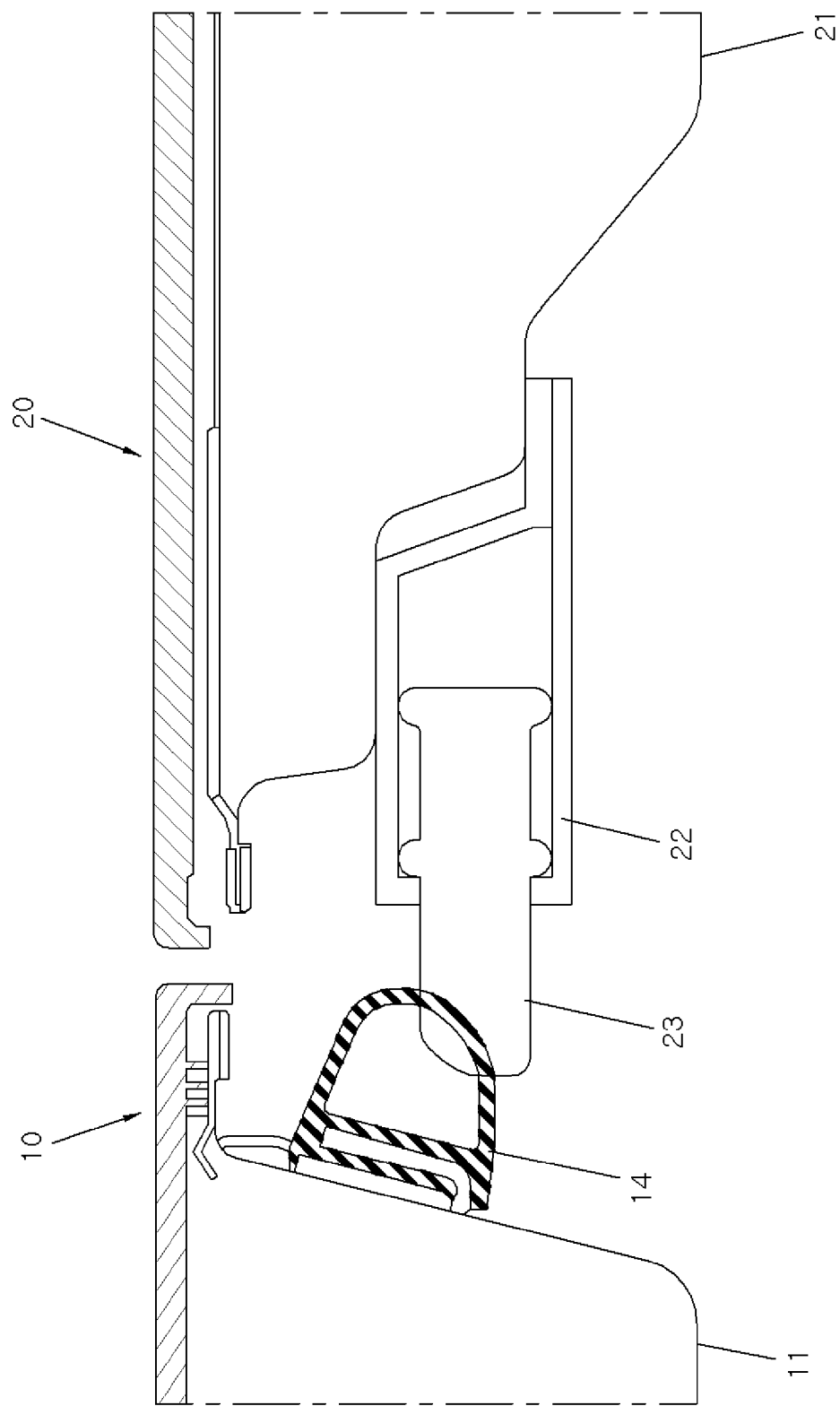

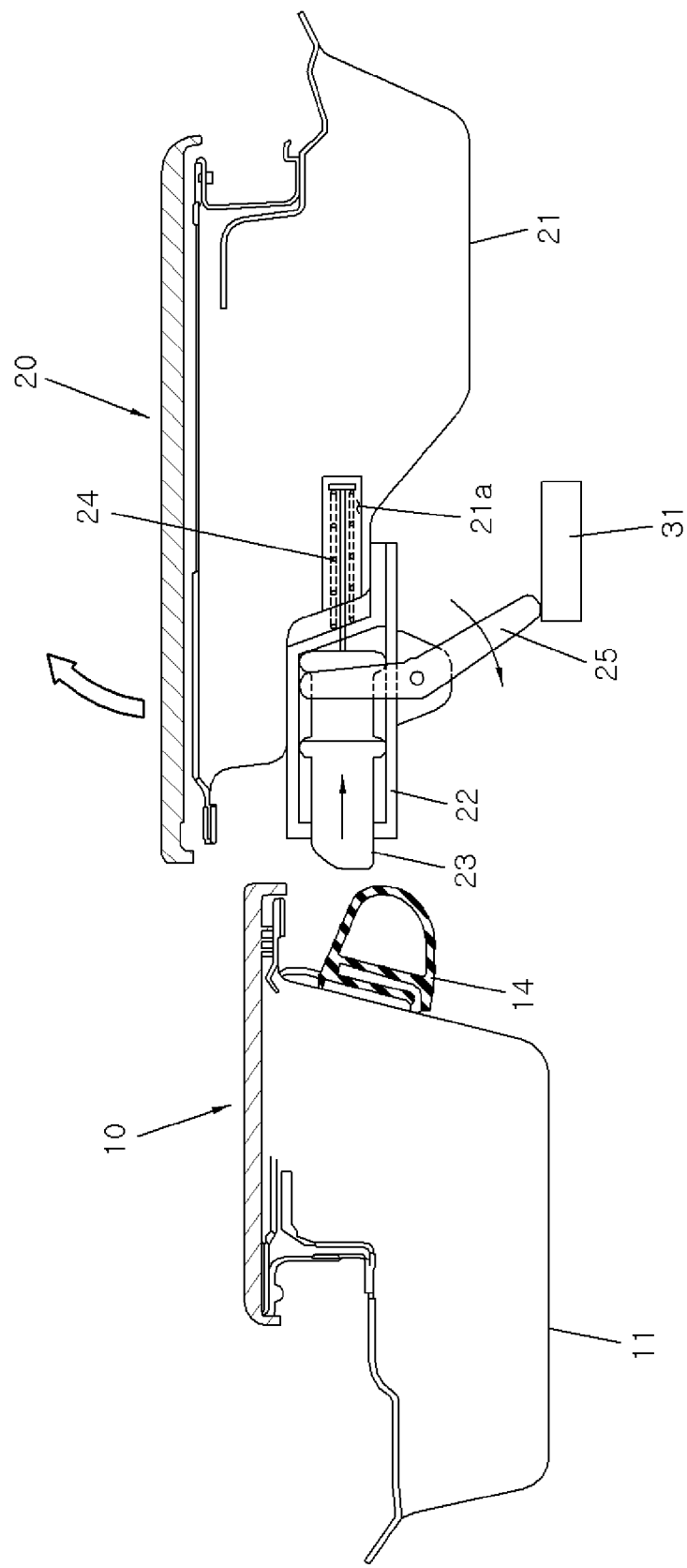

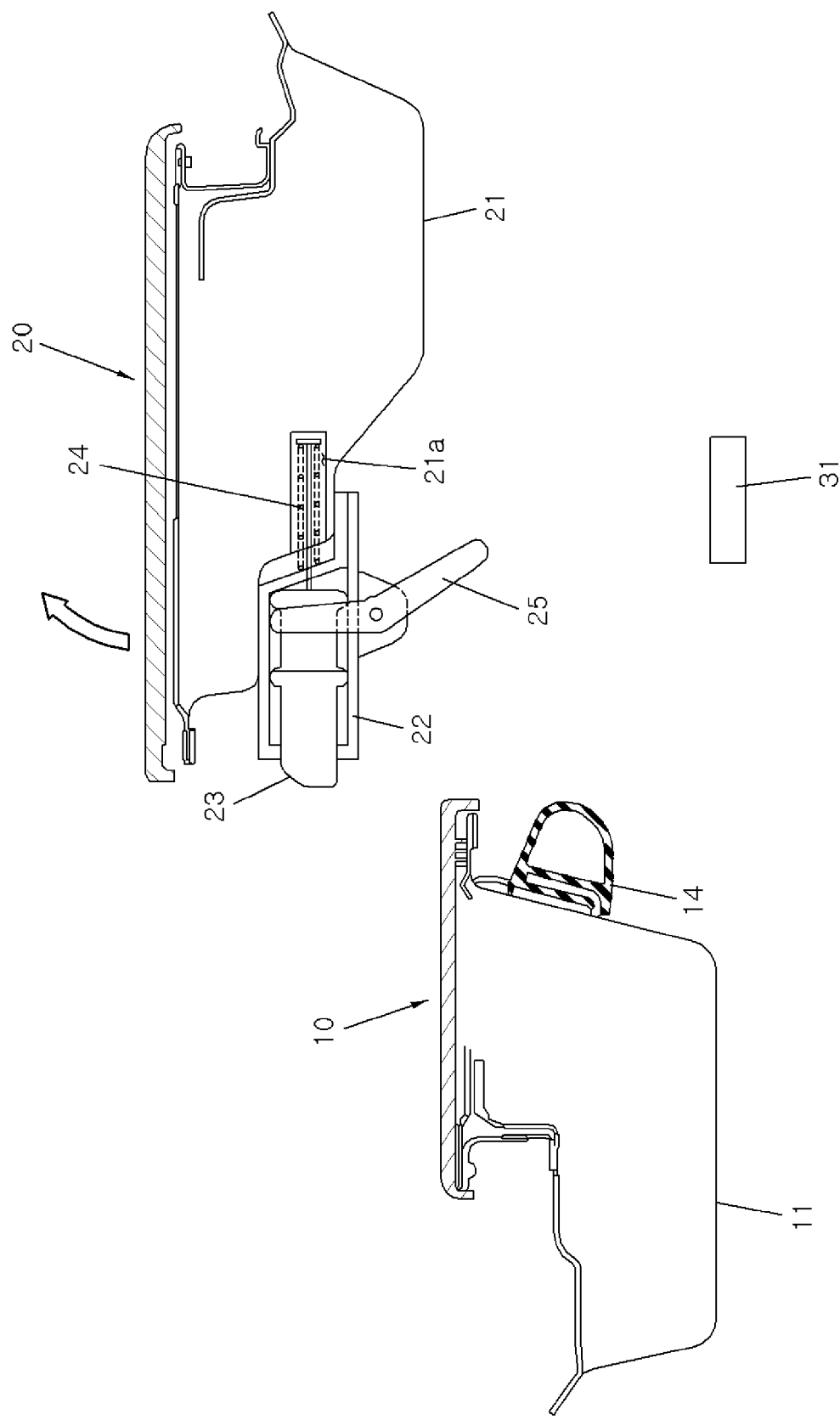

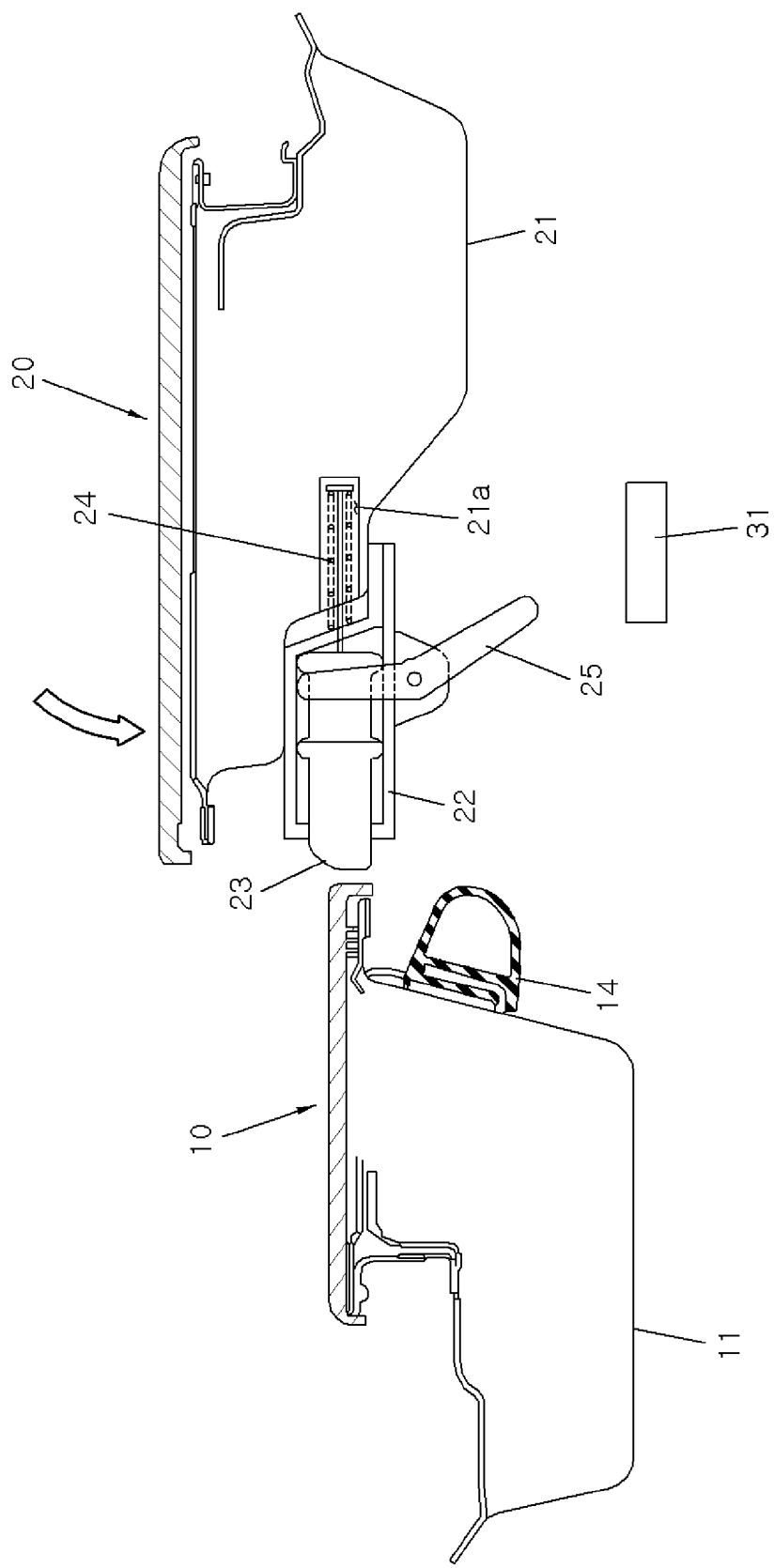

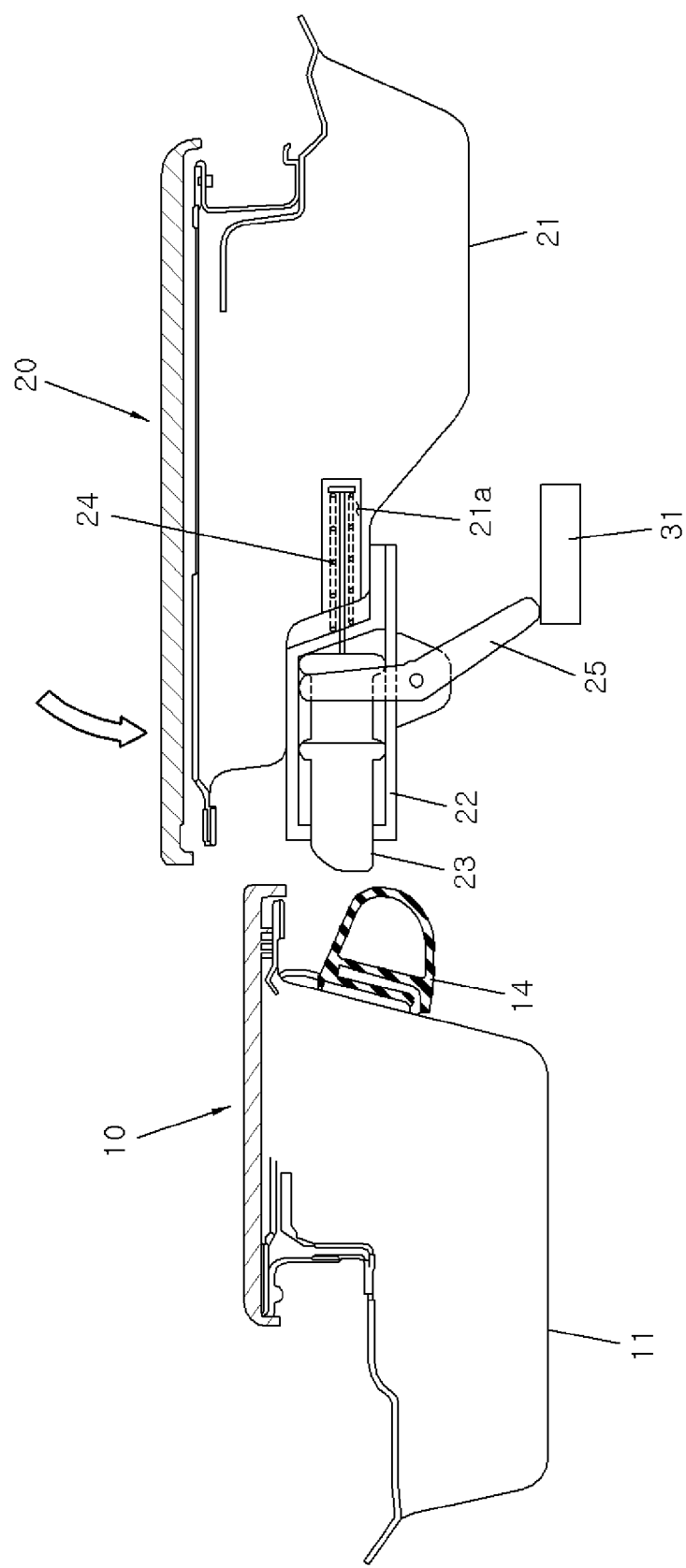

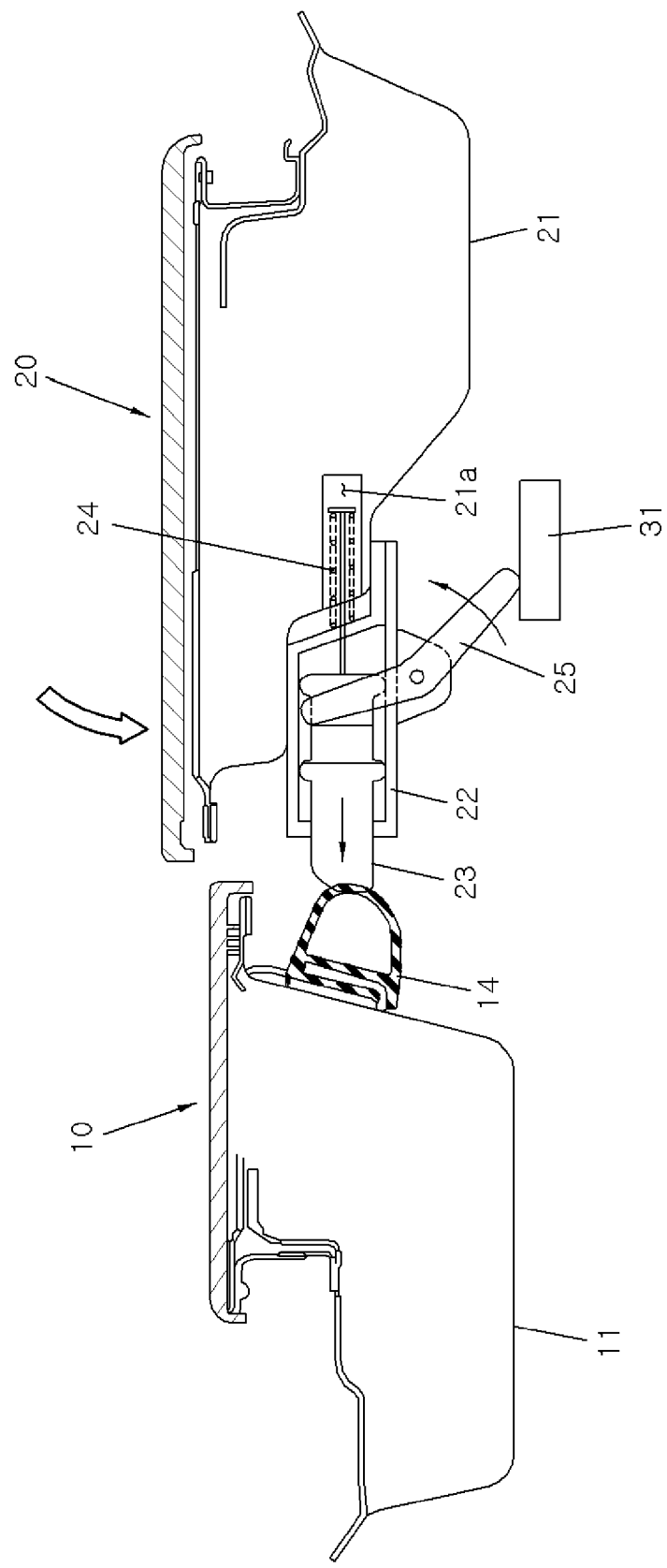

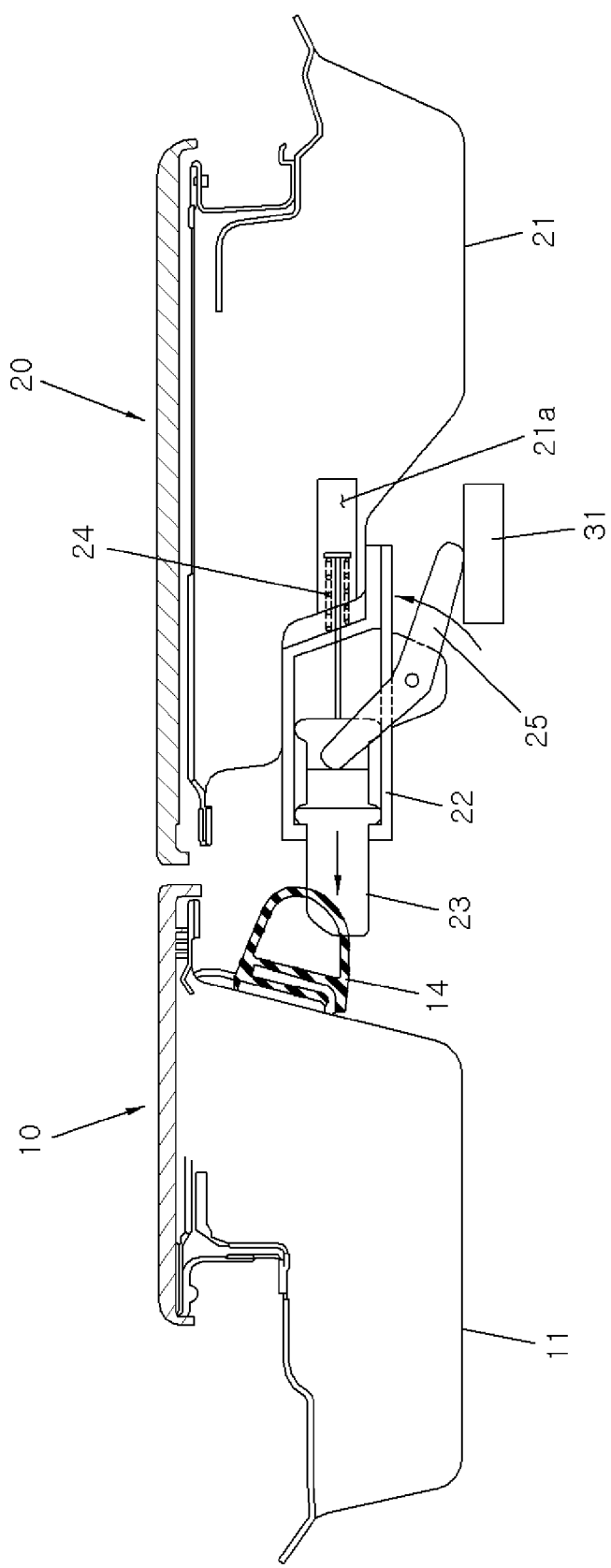

SLIDING-TYPE SEALING ASSEMBLY FOR DOOR OF VEHICLE

CROSS-REFERENCE TO RELATED APPLICATION

This application claims priority to Korean Patent Application No. 10-2019-0048591, filed on Apr. 25, 2019, which is incorporated herein by reference in its entirety.

BACKGROUND

Field of the Disclosure

The present disclosure relates to a sliding-type sealing assembly for door of vehicle, that opens and closes a front door and a rear door independently while air-tight sealing the space between the front door and the rear door in a vehicle having no center pillar, and to which an opposite-type swing door, in which the front door and the rear door swing in the direction opposite to each other, has been applied.

Description of Related Art

A vehicle door is installed on the side surface of a vehicle. A typical vehicle has a swing door in which the front end of the door is hinge-connected to a vehicle body, and the door is opened and closed in parallel with the ground. A weather strip of a rubber material is mounted on the circumference of the door for air-tight sealing when the door is closed. Since the weather strip is made of a rubber material, the air-tight seals the circumference of the door while the cross section thereof changes when the door is closed.

Meanwhile, as shown in FIG. 1 of the prior art, although the front door and the rear door are hinge-connected to the vehicle, a vehicle has been developed with an opposite-type swinging door with opening directions is opposite to each other. This type of door may be referred to as a coach door. Particularly, some vehicles are produced without applying a center pillar to maximize the sense of openness and further ease the entering and exiting of the vehicle. The opposite-type swing door is the same as the typical swing door in that it is opened in the lateral direction of the vehicle, but unlike a front door 110, the rear door 120 differs from the front door 110 in that the rear end of the rear door 120 is hinge-connected to the vehicle body and the rear door 120 is opened while rotating around the above.

FIG. 2 is a diagram showing a portion where the rear end of the front door 110 and the front end of the rear door 120 contact each other according to the prior art. The opposed-type coach door that is currently in production has a door frame of the front door 110 and a door frame of the rear door 120 that overlap each other. The portion where the front door 110 and the rear door 120 contact each other, for example, the rear end of the front door 110 and the front end of the rear door 120 are installed with a door panel, a trim, a weather strip, etc. together, as well as the door frame.

When the rear door 120 is first opened, a frame 121, a panel 122, a trim 123, a weather strip 124, etc. of the rear door 120 interfere with a side of the front door 110. In other words, as shown in FIG. 2, when the rear door 120 is opened and closed in a state where the front door 110 has been closed, the front end of the rear door 120 interferes with the front door 110. The front end of the rear door 120 should move along the trajectory A to avoid the interference. However, since the front end of the rear door 120 actually moves along the trajectory B, the frame 121, the panel 122, the trim 123, the weather strip 124 of the rear door 120, and the front end of the rear door 120 interfere with the frame 111, the panel 112, the trim 113, etc. of the front door 110 in this procedure.

Accordingly, the order of opening and closing the front door 110 and the rear door 120 are previously determined (e.g., preset). For example, the front door 110 is determined to be first opened when opening the door, and the rear door 120 is determined to be first closed when closing the door. The front door 110 and the rear door 120 may be sealed with the center pillar, respectively if a vehicle 1 has a center pillar, but otherwise, that is, in a vehicle having no center pillar, the front door 110 and the rear door 120 need to contact each other to be air-tight sealed. Therefore, the air-tight sealing between the front door 110 and the rear door 120 has been weak.

If the opening and closing orders (e.g., opening and closing sequence) of the door are not maintained in vehicles with the opposite-type swing door, it may be difficult to open and close the doors 110, 120. Alternatively, even if the opening and closing of the doors 110, 120 is possible, the weather strip 124 installed on the door 120 may be abraded by the friction with the door panel 112, the weather strip 124 may be damaged, and the air-tight sealing between the doors 110, 120 and the vehicle body may be damaged, thereby allowing foreign substances such as rainwater or dust to flow therein, or allowing the external noise into the vehicle 100.

The contents described in this section are merely to help the understanding of the background of the present disclosure, and may include what is not previously known to those skilled in the art to which the present disclosure pertains.

SUMMARY

The present disclosure provides a sliding-type sealing assembly for door of vehicle, in which a sealing member for opening and closing between a front door and a rear door may be inserted into the rear door when the rear door is opened and closed to prevent the sealing member from interfering with the front door, thereby opening and closing the front door and the rear door independently.

Another object of the present disclosure is to provide a sliding-type sealing assembly for door of vehicle, in which the sealing for the air-tight sealing between the front door and the rear door may be inserted into the rear door to prevent preventing the abrasion of the sealing. According to a sliding-type sealing assembly for door of vehicle according to the present disclosure for achieving the objects, as the sealing assembly for air-tight sealing the rear end of a front door of a vehicle and the front end of a rear door of the vehicle, a sealing slider may be installed to at least any one door of the rear end of the front door and the front end of the rear door slidably in the longitudinal direction of the vehicle, and the sealing slider may be slid to be spaced apart from the other door to avoid overlap with the other door when the door is opened, and is drawn out to be in close contact with the other door when the any one door is closed.

A door, on which the sealing slider is not installed, of the front door and the rear door may be installed with a weather strip that is in close or abutting contact with the sealing slider. The rear end of the front door and the front end of the rear door may be installed with a housing formed in a predetermined cross section along the height direction of the vehicle, and the sealing slider formed in the height direction of the vehicle may be installed inside the housing. The sealing slider may be inserted into the housing to slide in the longitudinal direction of the vehicle to draw out a portion of the sealing slider to the outside of the housing.

The sliding-type sealing assembly for the door of the vehicle may include a drawing-out device for drawing out the sealing slider from the housing; and an inserting device for inserting the sealing slider into the housing. The drawing-out device and the inserting device may be formed at the upper end and the lower end of the housing. The drawing-out device may include an operating lever rotatably installed on the housing to push the sealing slider to the outside of the housing when the door is closed; and a support fixedly installed to the vehicle body of the vehicle to rotate so that the operating lever pushes the sealing slider when the door is closed.

The upper end and the lower end of the sealing slider may be formed with an operating block to protrude from the sealing slider, respectively, and the operating lever may push the operating block so that the sealing slider is drawn out from the housing. When the operating lever draws out the sealing slider, the end portion of the sealing slider contacts the weather strip. Additionally, the inserting device may be a return spring installed to elastically support the sealing slider in the direction inserted into the housing.

In the housing, a first end of the return spring may be installed outside the side opposite to the direction in which the sealing slider is drawn out, and a second end of the return spring may be fixed to one side of the sealing slider. A rod may be formed to penetrate the return spring from the sealing slider, and the second end of the return spring may be fixed to the end portion of the rod to elastically support so that the sealing slider is inserted into the housing.

A door panel of the door may be formed with a rod receiving groove capable of receiving the return spring and the rod. A portion where the sealing slider and the weather strip contact may be formed to have a round shape to be convex toward the portion facing each other, respectively. The weather strip may be disposed further adjacent to the outside of the vehicle than the sealing slider.

The end portion of the weather strip may be disposed to be the same as (e.g., aligned with) the end portion of the door on which the weather strip has been installed or disposed further at the inside than the end portion of the door, and the end portion of the sealing slider may be disposed further at the outside than the end portion of the door on which the sealing slider has been installed based on the longitudinal direction of the vehicle 1.

The housing may be disposed at the front end of the rear door, and the weather strip may be disposed at the rear end of the front door. The vehicle 1 is not formed with a center pillar, and has the rear end of the front door and the front end of the rear door sealed by directly contacting each other. According to the sliding-type sealing assembly for the door of the vehicle of the present disclosure, the sealing slider is inserted into the rear door when the rear door is opened and closed, to prevent the sealing slider from interfering with the front door.

As described above, since the sealing slider does not interfere with the front door when the rear door is opened or closed, it may be possible to open and close the rear door independently from the front door. Therefore, since the front door and the rear door may be opened and closed regardless of the order thereof, the entering and exiting of the vehicle through the rear door becomes more convenience.

BRIEF DESCRIPTION OF THE DRAWINGS

These and/or other aspects of the invention will become apparent and more readily appreciated from the following description of the exemplary embodiments, taken in conjunction with the accompanying drawings of which:

FIG. 6 is a cross-sectional diagram according to the line VI-VI in FIG. 3 according to an exemplary embodiment the present disclosure;

FIGS. 7A to 7E are cross-sectional diagrams showing a state where the rear door is opened step by step in the sliding-type sealing assembly for the door of the vehicle according to an exemplary embodiment of the present disclosure; and FIGS. 8A to 8E are cross-sectional diagrams showing a state where the rear door is closed step by step in the sliding-type sealing assembly for the door of the vehicle according to an exemplary embodiment of the present disclosure.

DETAILED DESCRIPTION

Figure 1:
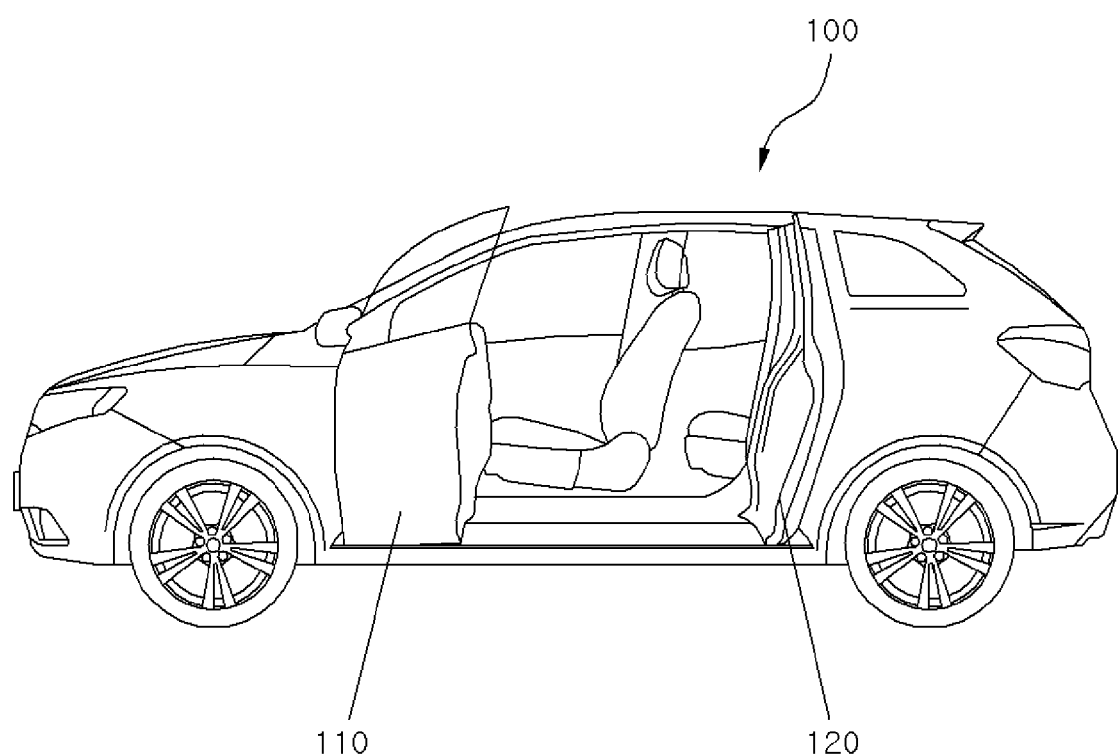
FIG. 1 is a side diagram showing a state where a front door and a rear door have been opened in a vehicle to which an opposite-type swing door has been applied according to the prior art.
Figure 2:
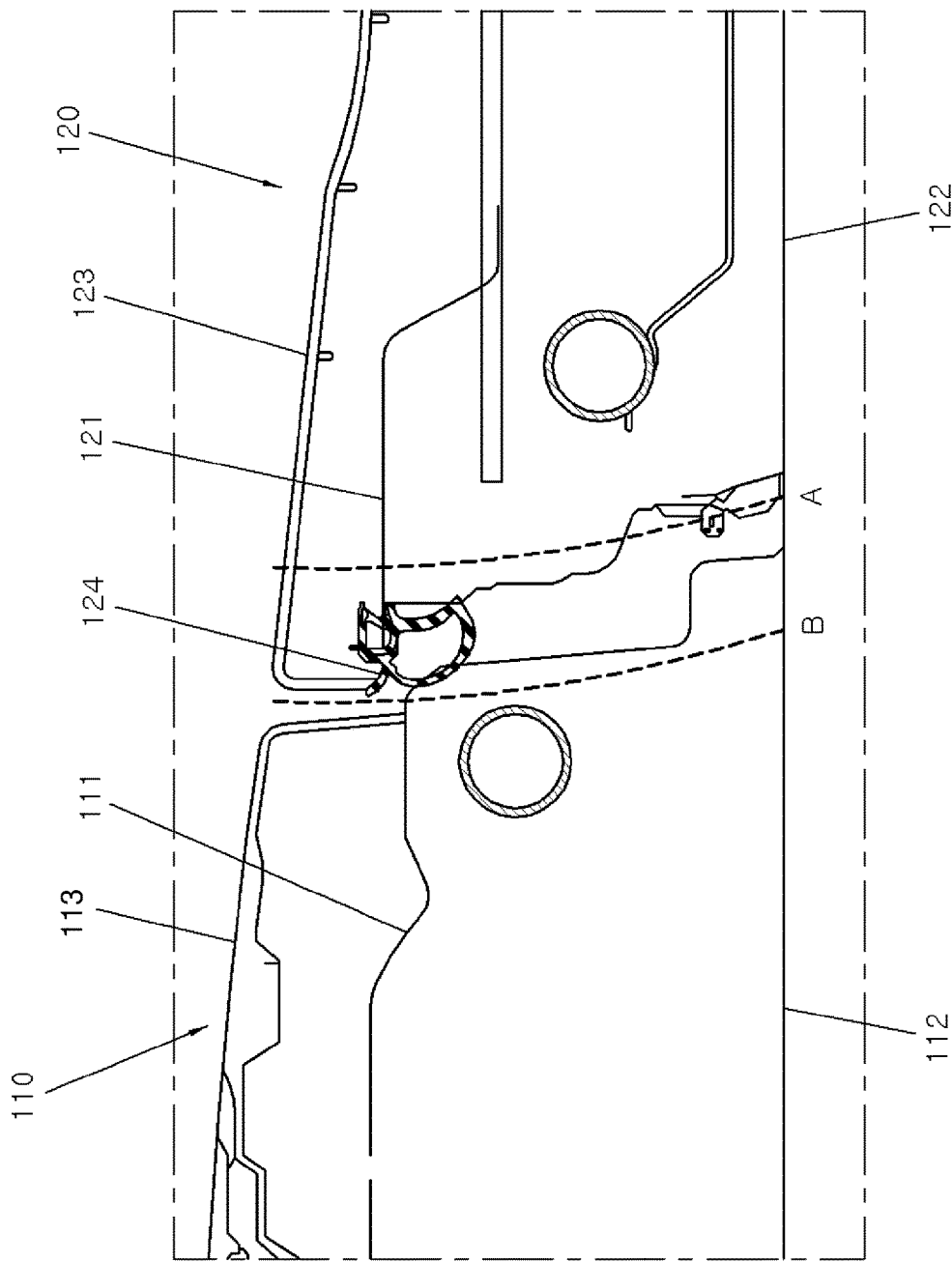
FIG. 2 is a cross-sectional diagram showing a portion where the front door and the rear door contact each other in FIG. 1 according to the prior art.
Figure 3:
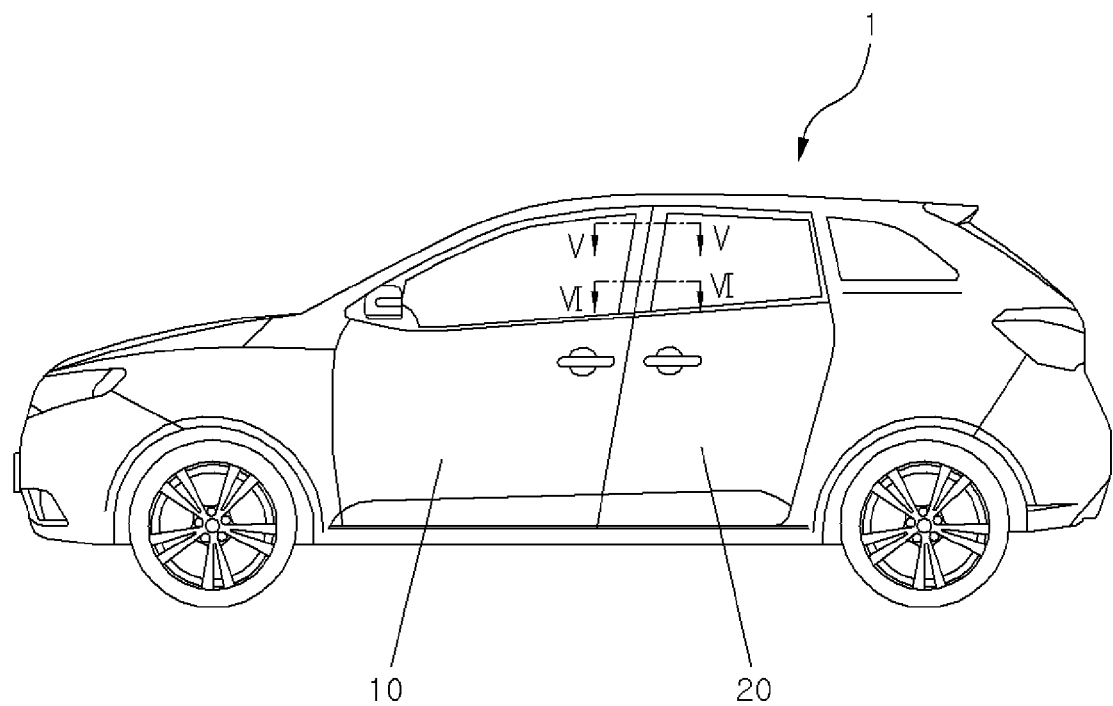
FIG. 3 is a side diagram of a vehicle to which a sliding-type sealing assembly for a door of the vehicle according to an exemplary embodiment the present disclosure has been applied.
Figure 4:
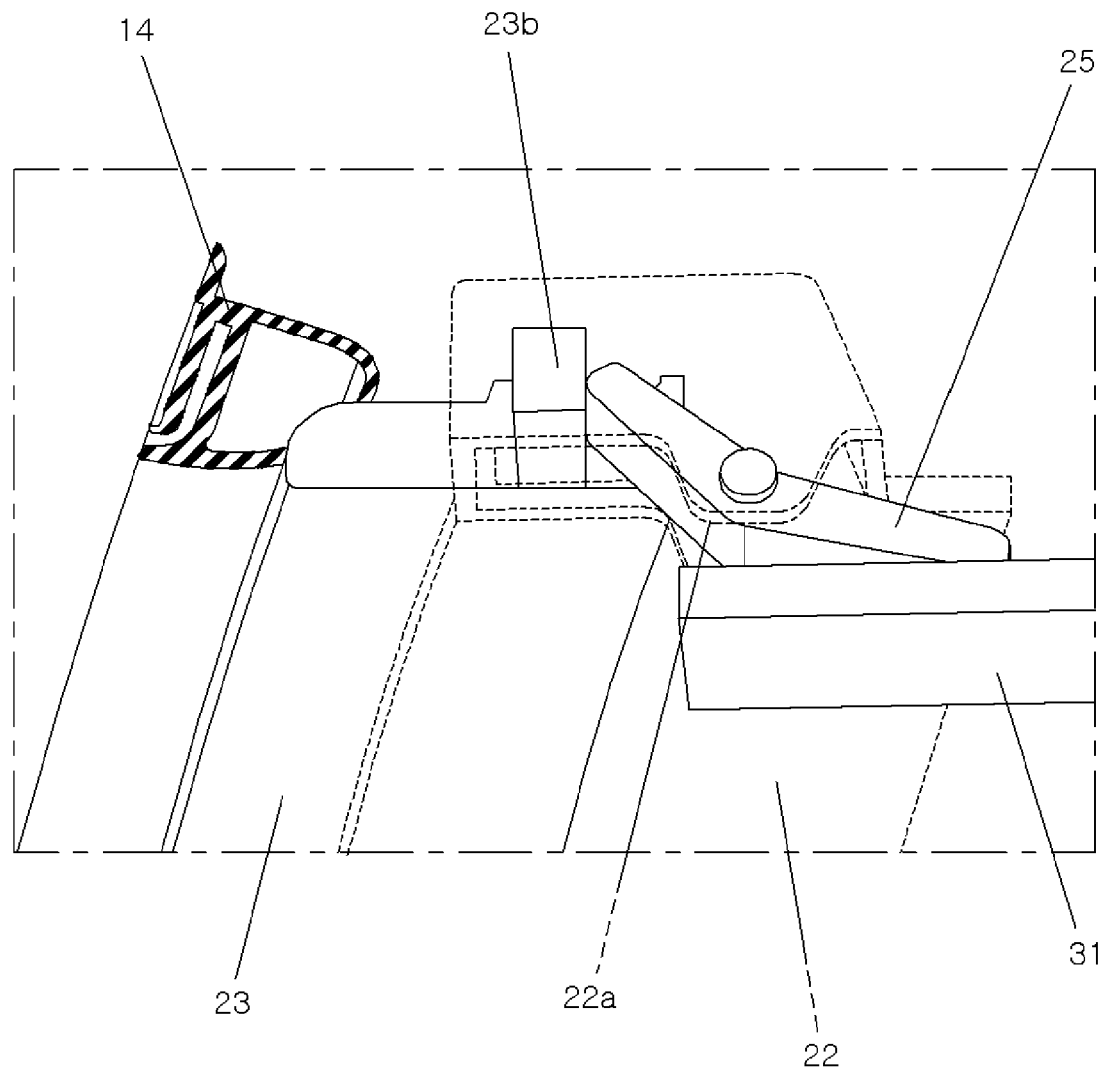
FIG. 4 is a perspective diagram showing the portion where the front door and the rear door contact each other in the sliding-type sealing assembly for the door of the vehicle according to an exemplary embodiment of the present disclosure (a rod and a return spring are not shown)

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a sliding-type sealing assembly for door of vehicle according to an exemplary embodiment of the present disclosure will be described in detail with reference to the accompanying drawings.

In a sliding-type sealing assembly for door of vehicle according to the present disclosure, the sealing assembly may be applied to an opposite-type swing door having the front end of a front door 10 and the rear end of a rear door 20 rotatably fixed to a vehicle body, respectively and for opening and closing the side surface of a vehicle 1 and for air-tight sealing between the rear end of the front door 10 and the front end of the rear door 20. In particular, a sealing slider 23 may be installed on at least any one of the doors 10, 20 of the rear end of the front door 10 and the front end of the rear door 20 slidably in the longitudinal direction of the vehicle, and the sealing slider 23 may be inserted into the doors 10, 20 when the doors 10, 20 are opened, and may be drawn out to be in close or abutting contact with the other one of the doors 10, 20 when the doors 10, 20 are closed.

Particularly, the present disclosure may be applied to a vehicle having no center pillar among the vehicles to which the opposite-type swing door has been applied. The rear end of the front door 10 and the front end of the rear door 20 should directly contact each other to be air-tight sealed in the vehicle having no center pillar and to which the opposite-type swing door has been applied.

Figure 5:
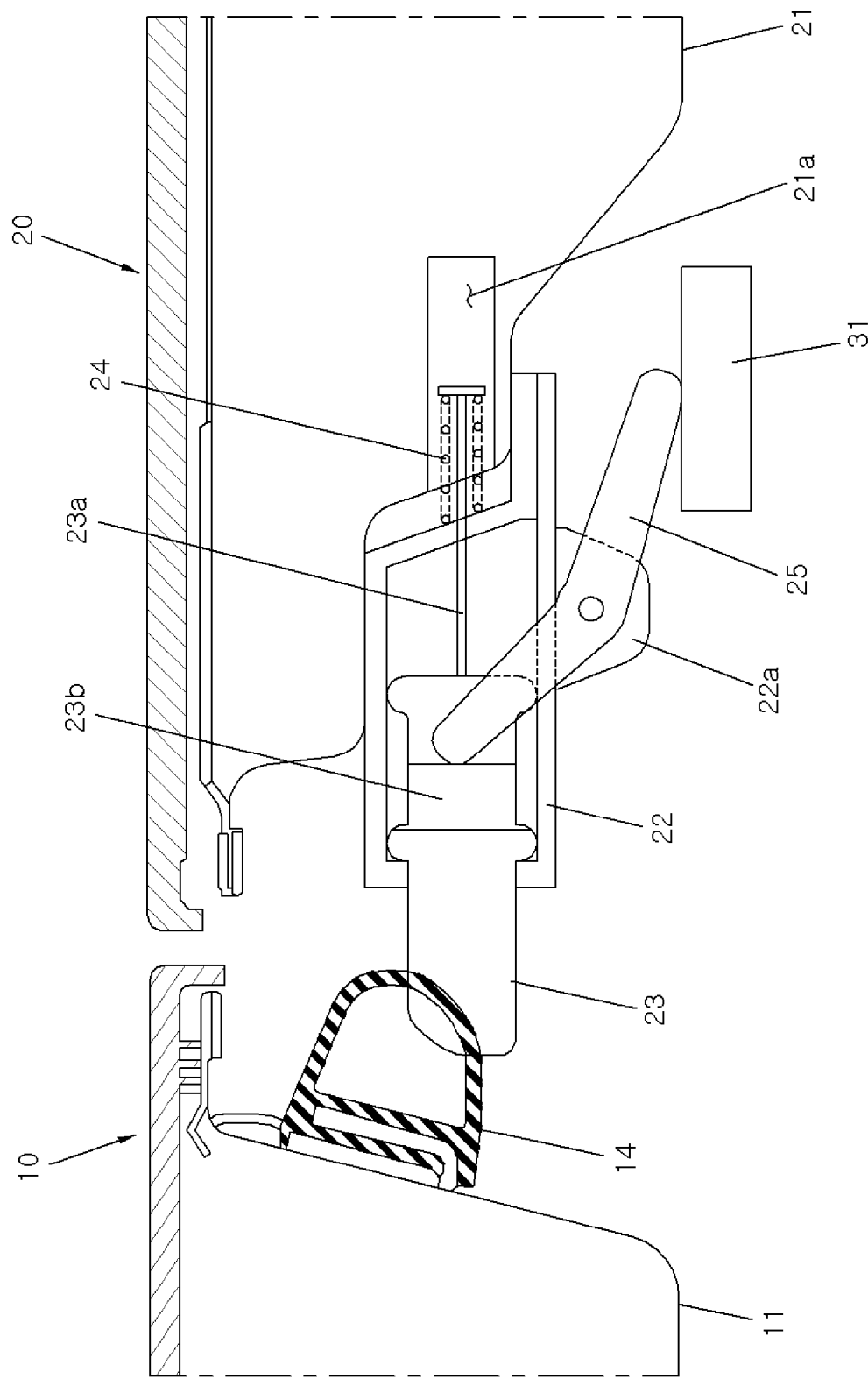
FIG. 5 is a cross-sectional diagram according to the line V-V in FIG. 3 according to an exemplary embodiment the present disclosure.

In addition, hereinafter, as shown in FIGS. 5 and 6, a configuration in which a weather strip 14 is installed at the rear end of the front door 10, and the sealing slider 23 is installed at the front end of the rear door 20 will be described as an example. However, the sealing slider may be installed at the rear end of the front door 10, and the weather strip may be installed at the front end of the rear door 20.

The weather strip 14 for the air-tight sealing with the rear door 20 may be installed at the rear end of the front door 10. The weather strip 14 may be made of a flexible material such as synthetic rubber, and may be installed at one side of a door panel 11 for forming the front door 10. In addition, the weather strip 14 may be deformed in cross section to be air-tight sealed when both the front door 10 and the rear door 20 have been closed.

Further, the front end of the rear door 20 may be installed with the sealing slider 23 that is drawn out or inserted according to the opening and closing of the rear door 20. A housing 22 may be installed at the front end of the rear door 20 to install the sealing slider 23 on the rear door 20. The housing 22 may have a predetermined shape to be formed in the vertical direction of the vehicle 1. A portion facing the front door 10 from the housing 22 may be formed in an opened state to draw out the sealing slider 23.

The sealing slider 23 may be formed to have a predetermined cross section to be inserted into the housing 22. In particular, the sealing slider 23 may have the front end drawn out through the open portion from the housing 22, and when the sealing slider 23 is maximally drawn out, the sealing slider 23 may abut the weather strip 14 to air-tight seal the rear end of the front door 10 and the front end of the rear door 20. The sealing slider 23 may also be made of a material such as synthetic rubber.

The front end of the sealing slider 23 may be formed to have a round shape to be air-tight sealed with the weather strip 14. A portion where the weather strip 14 and the sealing slider 23 contact each other may be formed to have a round shape to be convex toward the portion facing each other. The outside surface of the sealing slider 23 may be formed to be partially protruded so that the sealing slider 23 may slide stably without being detached from the inside of the housing 22.

Additionally, the upper end and the lower end of the housing 22 may include a drawing-out device for drawing out the sealing slider 23 from the housing 22 and an inserting device for inserting the sealing slider 23 into the housing 22, respectively. In other words, as shown in FIG. 5, the upper end and the lower end of the housing 22 may include the drawing-out device and the inserting device. As shown in FIG. 6, the drawing-out device and the inserting device are not formed at a portion between the upper end and the lower end of the housing 22.

In particular, the drawing-out device and the inserting device should be operated immediately after the rear door 20 is opened or immediately before the rear door 20 is closed, and may be operated by contacting the upper end and the lower end of the front end of the rear door 20 with the vehicle body of the vehicle 1, respectively. The drawing-out device and the inserting device may be disposed at the upper end and the lower end of the housing 22. Particularly, since the present disclosure is applied to the vehicle mounted with the opposite-type swing door having no center pillar, a portion excluding the upper end and the lower end of the housing 22 has no vehicle body-side member capable of interlocking with the opening and closing of the rear door 20, and thus, the drawing-out device and the inserting device may be disposed at the upper end and the lower end of the housing 22.

However, the inserting device may also be formed at intervals along the height direction of the vehicle 1. Since the sealing slider 23 is unable to be uniformly in close or abutting contact with the weather strip 14 by acting on the sealing slider 23 at the same point as or similar point to the drawing-out device and the inserting device, the inserting device may also be installed at the upper end and the lower end of the housing 22.

An example of the drawing-out device may be an operating lever 25 rotatably installed at the upper end and the lower end of the housing 22, respectively. The operating lever 25 may rotate by hinge-connecting the middle portion of the operating lever 25 to a bracket part 22a formed to extend outwards from the housing 22 at the upper end and the lower end of the housing 22. A first end of the operating lever 25 contacts an operating block 23b formed to protrude from the upper end and the lower end of the sealing slider 23. When the operating lever 25 rotates (counterclockwise in FIG. 5), a first end of the operating lever 25 pushes the operating block 23b causing the sealing slider 23 to be drawn out from the housing 22.

Meanwhile, a support 31 may be formed on the vehicle body of the vehicle 1 to rotate the operating lever 25 in interlock with the opening and closing of the rear door 20. The support 31 may be installed on the vehicle body, for example, a roof panel or a side chamber adjacent to the upper end and the lower end of the front end of the rear door 20 to contact a second end of the operating lever 25 to support the second end of the operating lever 25 to cause the operating lever 25 to rotate to draw out the sealing slider 23, in a state where the rear door 20 is closed or approaches the closed state.

Since the operating lever 25 should be interlocked with the support 31 fixed to the vehicle body, the operating lever 25 may be installed at the upper end and the lower end of the housing 22. The inserting device may be a return spring 24 for inserting the sealing slider 23 into the housing 22. The elastic force of the return spring 24 operates in the direction in which the sealing slider 23 is inserted into the housing 22 to insert the sealing slider 23 into the housing 22.

Accordingly, a rod 23a may be formed to extend from the rear end of the sealing slider 23, and the return spring 24 elastically supports the rear end of the rod 23a and thus, the return spring 24 inserts the sealing slider 23 into the housing 22. The return spring 24 may be installed at one side of the housing 22. For example, a first end of the return spring 24 may be disposed at the outside of the housing 22, and a second end of the return spring 24 may be connected to the rear end of the rod 23a.

Meanwhile, one side of a door panel 21 may be formed with a rod receiving groove 21a that receives the return spring 24 and the rod 23a and thus, the rod 23a may be inserted and the return spring 24 may be installed. The weather strip 14 may be disposed further adjacent to the outside of the vehicle 1 than the sealing slider 23. Referring to FIGS. 5 and 6, the weather strip 14 is shown to be higher than the sealing slider 23 to ease the opening and closing of the front door 10 when the sealing slider 23 has been drawn out since the weather strip 14 is fixedly installed to the front door 10, and the sealing slider 23 is installed slidably on the housing 22.

In addition, the end portion of the weather strip 14 may be disposed to be the same as (e.g., to be aligned with) the end portion of the door panel 11 of the front door 10 or disposed further toward the inside with respect to the longitudinal direction of the vehicle than the end portion thereof. In FIGS. 5 and 6, the right end portion of the front door 10 and the right end portion of the weather strip 14 are shown in the same manner as each other for ease of the opening and closing of the front door 10 when the sealing slider 23 has been drawn out.

Meanwhile, the front end of the sealing slider 23 may be disposed further toward the outside with respect to the longitudinal direction of the vehicle than the front end of the door panel 21 of the rear door 20 for the air-tight sealing in the sealing slider 23. In FIGS. 5 and 6, the left end portion of the sealing slider 23 is disposed further at the left side (outside) than the left end portion of the rear door 20.

Figure 7A:
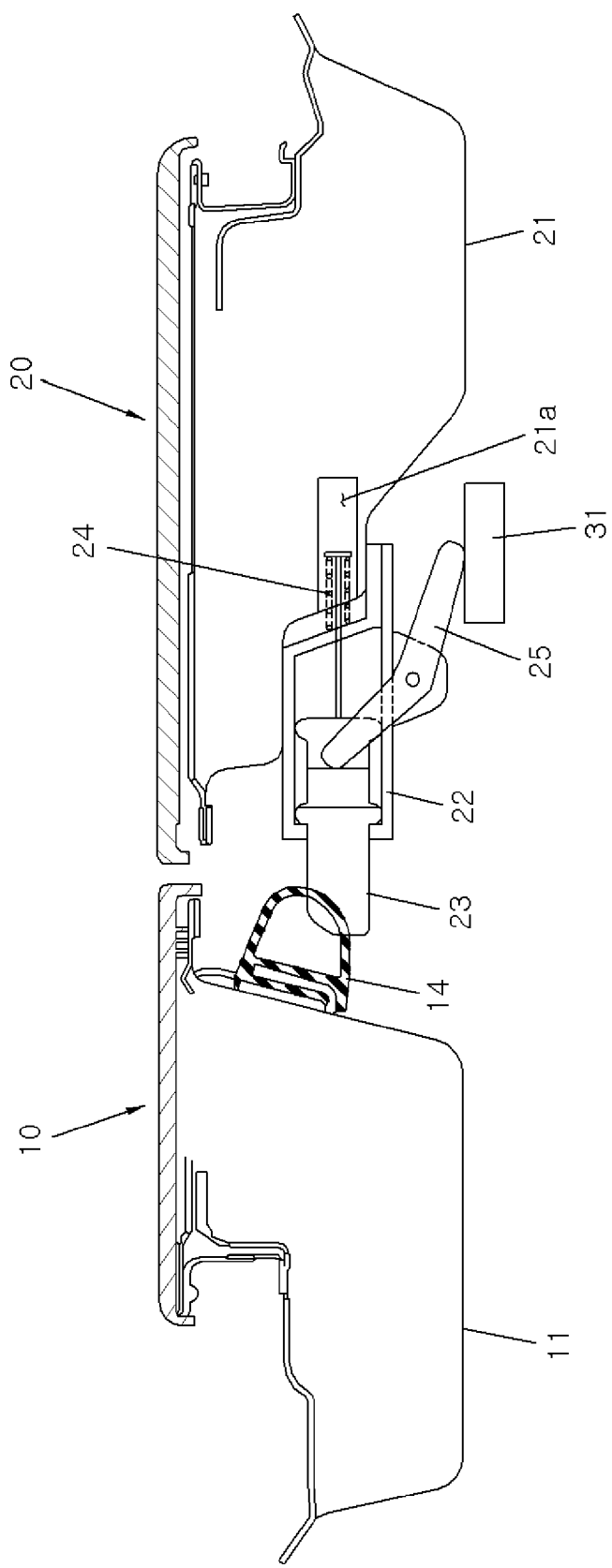
Figure 7B:
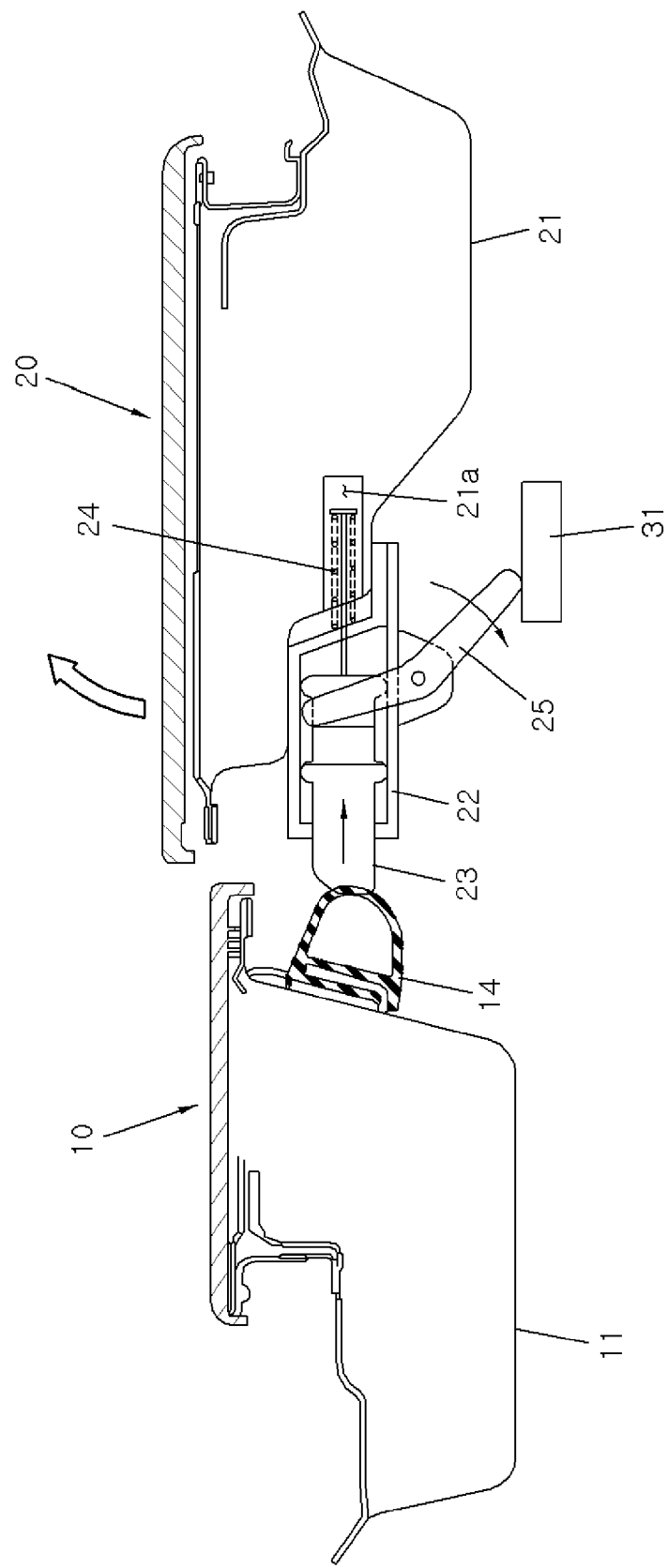
Figure 7D:
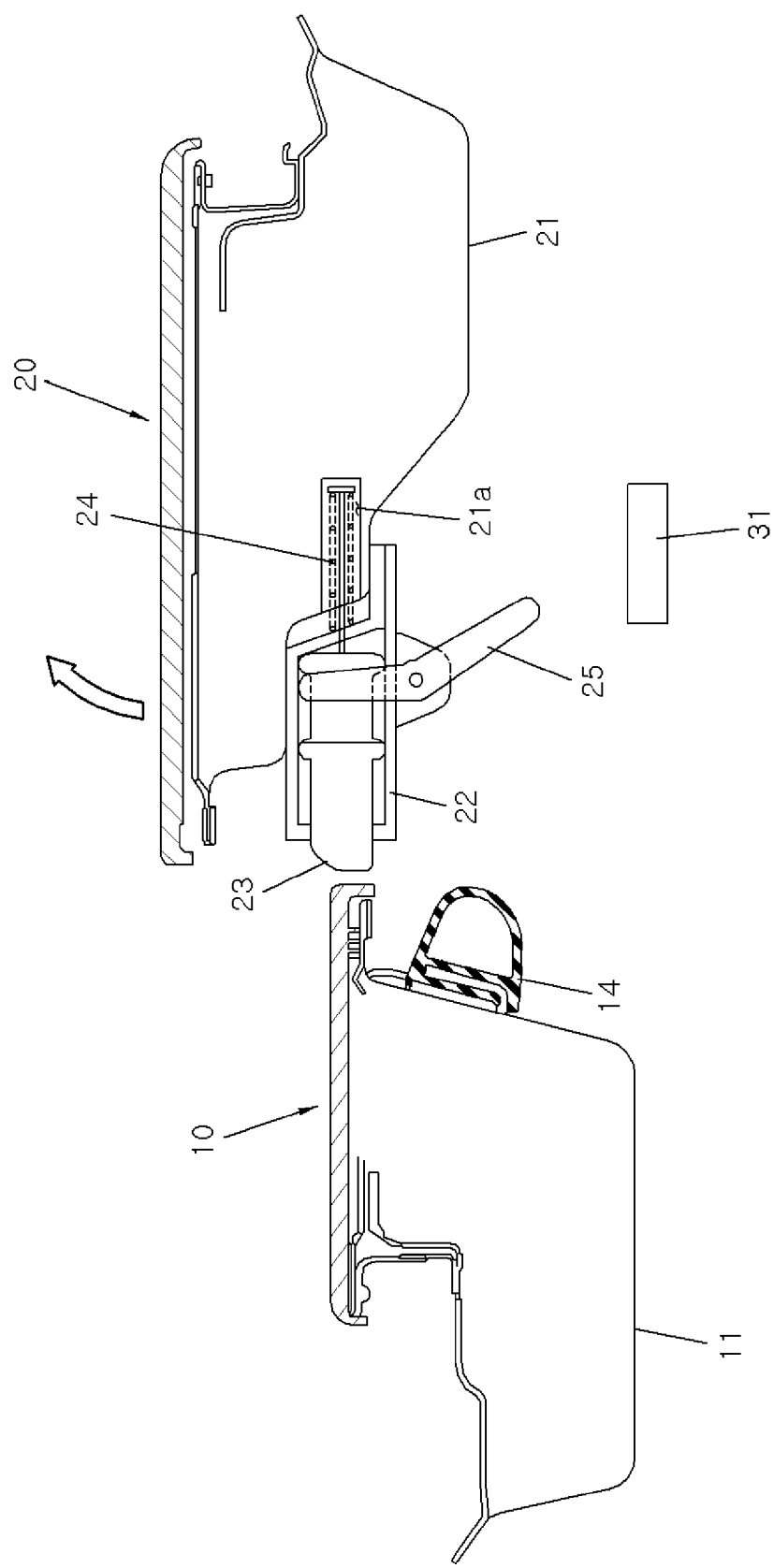
Figure 8A:
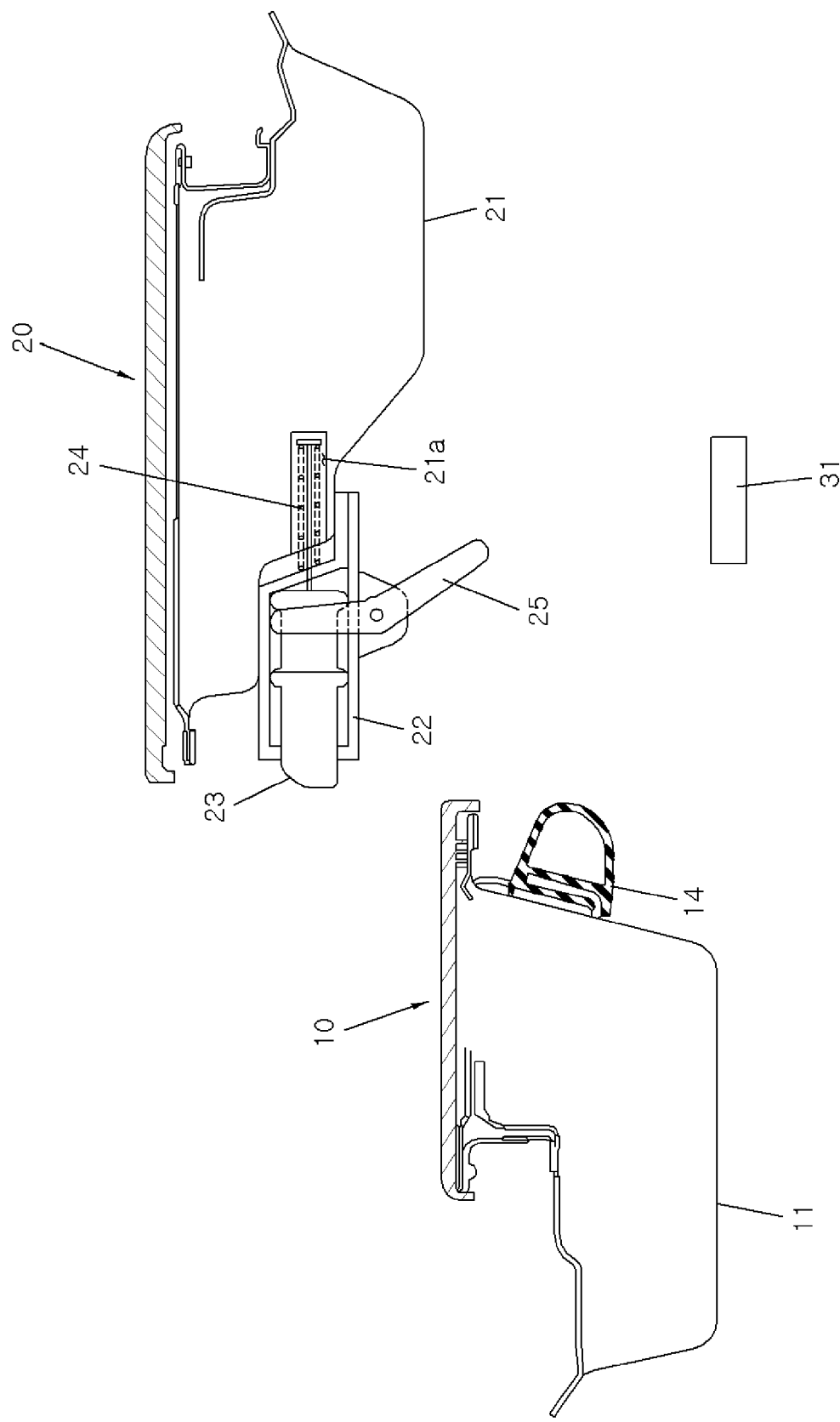

The operation of the sliding-type sealing assembly for the door of the vehicle according to the present disclosure having the above-described structure will be described as follows. FIGS. 7A to 7E are diagrams showing a procedure in which the rear door 20 is opened step by step from the closed state (FIG. 7A). Since the sealing slider 23 is drawn out by the operating lever 25 when the rear door 20 has been closed, the air-tight sealed state may be maintained between the rear end of the front door 10 and the front end of the rear door 20 since the front end of the sealing slider 23 is in close or abutting contact with the weather strip 14 installed at the rear end of the front door 10.

In this state, when the passenger opens the rear door 20, the sealing slider 23 may be inserted into the housing 22 by the return spring 24, and the sealing slider 23 does not interfere with the rear end of the front door 10 when the rear door 20 is opened. Reviewing the above sequentially, when the rear door 20 starts to open (see FIG. 7B), the sealing slider 23 starts to be inserted into the housing 22 by the elastic force of the return spring 24. As the sealing slider 23 is inserted into the housing 22, the sealing slider 23 starts to rotate the operating lever 25. Since the second end of the operating lever 25 contacts the support 31 at the initial stage of opening the rear door 20, the state changes to where the sealing slider 23 is not inserted into the housing 22.

As shown in FIG. 7C, as the opening of the rear door 20 proceeds, the sealing slider 23 is further inserted into the housing 22 by the elastic force of the return spring 24, and the sealing slider 23 rotates the operating lever 25. Meanwhile, when the opening of the rear door 20 further proceeds and the operating lever 25 and the support 31 are spaced apart from each other (see FIG. 7D), the sealing slider 23 changes to a state of being maximally inserted into the housing 22. Since the sealing slider 23 is maximally inserted into the housing 22, the sealing slider 23 does not interfere with the front door 10 when the rear door 20 is opened.

As described above, the sealing slider 23 may be disposed further at the outside than the front door 10 to freely open the rear door 20 when the sealing slider 23 has been maximally inserted into the housing 22. Meanwhile, when the passenger opens the front door 10, the opening of the front door 10 is not blocked by the sealing slider 23 since the weather strip 14 is disposed further at the outside than the sealing slider 23, thereby being opened as it is.

FIGS. 8A to 8E are diagrams showing a state where the rear door 20 is closed step by step. When the passenger closes the rear door 20 when the rear door 20 has been completely opened (see FIG. 8A), the rear door 20 rotates freely. As in the state shown in FIG. 8C after the state shown in FIG. 8B, the second end of the operating lever 25 starts to contact the support 31 when the rear door 20 approaches the closed state.

When the rear door 20 is closed in a state where the second end of the operating lever 25 has contacted the support 31 (see FIG. 8D), the first end of the operating lever 25 pushes the operating block 23b while the operating lever 25 rotates. The sealing slider 23 starts to be drawn out from the housing 22 since the operating force by which the first end of the operating lever 25 pushes the operating block 23b is greater than the elastic force of the return spring 24. The amount of rotation of the operating lever 25 increases as the closing of the rear door 20 proceeds, the amount of the sealing slider 23 drawn out also increases as the amount of rotation of the operating lever 25 increases, and the front end of the sealing slider 23 starts to contact the weather strip 14.

When the closing of the rear door 20 is completed (see FIG. 8E), the amount of rotation of the operating lever 25 may be maximized and the sealing slider 23 may also be drawn out maximally, and thus, the front end of the sealing slider 23 may be changed to a state that is in close or abutting contact with the weather strip 14. The sealing slider 23 and the weather strip 14 may be in close or abutting contact with each other, thereby maintaining the air-tight sealed state between the front door 10 and the rear door 20. Meanwhile, when the front door 10 is closed in the opened state, the weather strip 14 is in close or abutting contact with the sealing slider 23 at the time point when the closing of the front door 10 is completed and thus, the air-tight sealing is made between the front door 10 and the rear door 20.

As described above, in the vehicle to which the opposite-type swing door is applied and having no center pillar, the front end of the rear door 20 does not interfere with the rear end of the front door 10 when the rear door 20 is opened and closed, thereby opening and closing the front door 10 and the rear door 20 independently. Therefore, since it is not necessary to open the front door 10 when the passenger on the rear seat enters and exits the vehicle, thus increase user convenience.

What is claimed is:
1. A sealing assembly for a door of a vehicle, comprising:
   a housing provided on the door, wherein the door is a first door of the vehicle;
   a sealing slider moveably mounted in the housing;

a drawing-out device for urging the sealing slider from the housing;

an inserting device for urging the sealing slider into the housing; and a weather strip for air-tight sealing with the sealing slider when the first door is closed, wherein the drawing-out device includes an operating lever rotatably installed in the housing to push an end portion of the sealing slider away from the housing and a support fixedly mounted on a vehicle body of the vehicle to rotate the operating lever in response to closing of the first door, wherein the sealing slider is slidably movable in a longitudinal direction of the vehicle between a front end of the first door and a rear end of a second door, wherein the sealing slider is slid to be spaced apart from the second door to avoid overlapping with the second door when the first door is opened, and wherein the sealing slider is urged away from the housing to be in abutting contact with the weather strip disposed on the second door when the first door is closed.

2. The sealing assembly for the door of the vehicle of claim 1, wherein the weather strip is in abutting contact with the end portion of the sealing slider when the first door is closed.

3. The sealing assembly for the door of the vehicle of claim 2, wherein the housing is disposed on the first door at a predetermined position in a height direction of the first door.

4. The sealing assembly for the door of the vehicle of claim 3, wherein the sealing slider is slidable relative to the housing in the longitudinal direction of the vehicle.

5. The sealing assembly for the door of the vehicle of claim 2, wherein a portion of each of the sealing slider and the weather strip has a round shape.

6. The sealing assembly for the door of the vehicle of claim 1, wherein:

the operating lever is rotatably mounted on a bracket part of the housing, and the operating lever is configured to push the end portion of the sealing slider away from the housing when the first door is closed; and the support fixedly mounted on the vehicle body causes a distal end of the operating lever to push the sealing slider when the first door is closed.

7. The sealing assembly for the door of the vehicle of claim 6, wherein when the operating lever pushes the end portion of the sealing slider away from the housing, the end portion of the sealing slider contacts the weather strip.

8. The sealing assembly for the door of the vehicle of claim 6, wherein an operating block is positioned between an upper end and a lower end of the sealing slider, and the operating lever pushes the operating block to push the sealing slider away from the housing when the first door is closed.

9. The sealing assembly for the door of the vehicle of claim 1, wherein the inserting device is a return spring which elastically urges the sealing slider toward the housing.

10. The sealing assembly for the door of the vehicle of claim 9, wherein a first end of the return spring is positioned outside of the housing, and a second end of the return spring is fixed to the sealing slider.

11. The sealing assembly for the door of the vehicle of claim 10, wherein a rod extends through the return spring, and the return spring is positioned between an end portion of the rod and the housing.

12. The sealing assembly for the door of the vehicle of claim 11, wherein a door panel of the first door has a rod receiving groove in which at least a portion of the return spring and the rod are received.

13. The sealing assembly for the door of the vehicle of claim 1, wherein the weather strip is positioned closer to an outside of the vehicle than the sealing slider.

14. The sealing assembly for the door of the vehicle of claim 13, wherein an end portion of the weather strip is aligned with an end portion of the second door, and wherein the end portion of the sealing slider extends beyond an end portion of the first door in the longitudinal direction of the vehicle at least when the first door is closed.

* * * * *